(12) United States Patent
Rasanen (10) Patent No.: US 11,459,788 B1
(45) Date of Patent: Oct. 4, 2022

(54) PRIVACY AND WEATHER SHIELD

(71) Applicant: Richard W. Rasanen, Montesano, WA (US)

(72) Inventor: Richard W. Rasanen, Montesano, WA (US)

( * ) Notice: Subject to any disclaimer, the term of this patent is extended or adjusted under 35 U.S.C. 154(b) by 0 days.

(21) Appl. No.: 17/568,005

(22) Filed: Jan. 4, 2022

(51) Int. Cl.
*E04H 15/06* (2006.01)
*E04H 15/64* (2006.01)
*E04H 15/48* (2006.01)
*B60J 11/06* (2006.01)

(52) U.S. Cl.
CPC .............. *E04H 15/06* (2013.01); *B60J 11/06* (2013.01); *E04H 15/48* (2013.01); *E04H 15/64* (2013.01)

(58) Field of Classification Search
CPC ......... B60J 11/06; E04H 15/06; E04H 15/003
See application file for complete search history.

(56) References Cited

U.S. PATENT DOCUMENTS

| | | | | |
|---|---|---|---|---|
| 1,126,293 A * | 1/1915 | Ryder | ..................... | A45B 11/00 |
| | | | | 135/20.1 |
| 1,741,424 A * | 12/1929 | Lundstrom | ............. | E04H 15/06 |
| | | | | 135/88.13 |
| 2,027,551 A * | 1/1936 | Rideout | .................. | E04H 15/06 |
| | | | | 135/88.13 |
| 6,044,856 A * | 4/2000 | Cano | ....................... | B60J 5/0494 |
| | | | | 296/99.1 |
| 6,640,868 B1 * | 11/2003 | Guggisberg | ............ | E04H 15/38 |
| | | | | 160/84.07 |
| D492,640 S * | 7/2004 | Greene | ........................ | D12/401 |
| 7,464,983 B1 * | 12/2008 | Acosta | .................... | E04H 15/06 |
| | | | | 296/159 |
| 8,240,323 B2 * | 8/2012 | Lee | ......................... | B60R 11/00 |
| | | | | 160/63 |
| 8,276,607 B2 * | 10/2012 | Kim | ...................... | A45B 23/00 |
| | | | | 135/88.07 |
| 8,708,027 B2 | 4/2014 | Howie et al. | | |
| 9,090,153 B1 * | 7/2015 | Boyd | ....................... | B60J 11/06 |
| 9,403,426 B1 * | 8/2016 | Boyd | ..................... | B60J 5/0494 |
| 9,834,951 B1 * | 12/2017 | Townley | .................. | B60J 5/101 |
| 10,113,328 B1 | 10/2018 | Polisar et al. | | |

(Continued)

FOREIGN PATENT DOCUMENTS

CN 201432627 Y * 3/2010
KR 20170081591 A * 7/2017

*Primary Examiner* — David R Dunn
*Assistant Examiner* — Danielle Jackson
(74) *Attorney, Agent, or Firm* — Dale J. Ream (57) ABSTRACT

A privacy and weather shield for use with an automobile having a side door includes a canopy including first and second panels pivotally coupled together and each having opposed front and rear edges, respectively, each panel having a framework covered by a waterproof material. The canopy includes a runner slidably coupled to a shaft and a plurality of stretchers are operatively coupled to the runner and to the canopy such that movement of the runner causes the stretchers to move the canopy between a stowed configuration in which the panels are folded/stowed and a deployed configuration in which the panels are extended/deployed. The canopy may be secured atop an automobile cab and door with an elastic fastener extending between the runner and the side door of the automobile. First and second curtains may be releasably coupled to the canopy.

20 Claims, 9 Drawing Sheets

(56) References Cited

U.S. PATENT DOCUMENTS

| | | | |
|---|---|---|---|
| 2006/0162755 A1* | 7/2006 | Platek | E04H 15/001 296/159 |
| 2009/0056887 A1 | 3/2009 | Britt | |
| 2019/0183277 A1 | 6/2019 | Dimick | |

* cited by examiner

PRIVACY AND WEATHER SHIELD

BACKGROUND OF THE INVENTION

This invention relates generally to clothing changing assemblies and, more particularly, to a privacy and weather shield that provides portable privacy to a user who needs to change clothes in an otherwise outdoor public environment and provides privacy from both a horizontal position and from an elevated position. Protection is also provided from a weather event such as rain.

Youth sports leagues and teams have become very important and active to families with children or grandchildren. Commonly, practices and games may be held at remote locations and immediately after school, church, dance practice, or the like. Many sporting events locations, whether a soccer field, a baseball or softball field, or even basketball complex may not have sufficient facilities to change clothing or sports gear. Instead, child athletes often have to change from street clothing to athletic wear or team uniform inside their own or their parent's automobile. In order to stand up, such as to insert one's legs into a pair of pants, one or both side doors of the automobile may be opened for convenience as well as for a limited amount of privacy.

Various devices have been proposed in the prior art for providing a level of privacy to a person changing clothing adjacent an open door of a vehicle. Although presumably effective for their intended purposes, the existing devices are still insufficient to provide privacy from an elevated position, such as from a person standing on a hill, on bleachers, from an elevated truck bed, or the like. Further, existing privacy assemblies do not shield a user from weather events such as rain or snow. It would especially be desirable to have a canopy in place when putting a car carrier and baby inside the automobile when it is raining.

Therefore, it would be desirable to have a privacy and weather shield having a canopy that provides privacy from an elevated viewpoint. Further, it would be desirable to have a privacy and weather shield having a canopy that may be biased in a tight configuration atop a cabin and open door of an automobile. In addition, it would be desirable to have a privacy and weather shield that is portable and includes curtains that may be quickly and easily coupled to respective peripheral edges of the canopy. Still further, it would be desirable to have a privacy and weather shield having a canopy that may be coupled to the automobile door for stability when deployed,

SUMMARY OF THE INVENTION

A privacy and weather shield according to the present invention for use with an automobile having a side door includes a canopy including first and second panels pivotally coupled together and each having opposed front and rear edges, respectively, each panel having a framework covered by a waterproof material. The canopy includes a shaft positioned along a bottom surface between the first and second panels that defines a longitudinal axis. A runner is slidably coupled to the shaft. A plurality of stretchers is operatively coupled to the runner and to the first and second panels such that movement of the runner causes the stretchers to move the first and second panels between a stowed configuration at which the second panel is pivoted about the longitudinal axis and urged toward the first panel in a folded manner and a deployed configuration at which the first and second panels are pivoted about the axis and urged away from one another in an extension manner.

An elastic fastener having a first end coupled to the runner and a second end releasably coupled to the side door of the automobile. In an embodiment, a first curtain is attached to rear edges of the canopy and a second curtained is attached to an outside side edge of the canopy.

Therefore, a general object of this invention is to provide a privacy and weather shield that provides a private area for a person in the vicinity of an automobile to change clothing without being viewed by other people.

Another object of this invention is to provide a privacy and weather shield, as aforesaid, that not only surrounds a person at ground level but includes a canopy for preventing view from an elevated geographic position.

Still another object of this invention is to provide a privacy and weather shield, as aforesaid, that is portable, i.e., that may be assembled and disassembled quickly and easily.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3b is an isolated view on an enlarged basis taken from FIG. 3a;

FIG. 5b is an isolated view on an enlarged basis taken from FIG. 5a;

FIG. 6b is an isolated view on an enlarged basis taken from FIG. 6a;

FIG. 6c is an isolated view on an enlarged basis taken from FIG. 6a;

FIG. 8b is an isolated view on an enlarged basis taken from FIG. 8a;

DESCRIPTION OF THE PREFERRED EMBODIMENT

A privacy and weather shield according to a preferred embodiment of the present invention will now be described with reference to FIGS. 1 to 9b of the accompanying drawings. The privacy and weather shield 10 includes a canopy 20, a linkage 30 for opening/closing of the canopy 20, at least a first curtain 40, and a second curtain 42 that may be releasably attached to selected edges of the canopy 20. The privacy and weather shield 10 is configured for portable use on an automobile 100 having a side door 102.

A critical aspect of the privacy and weather shield 10 is the canopy 20 that may be releasably mounted atop the automobile 100 and its open door 102 as well as because the curtains 40, 42 depend from edges of the canopy 20, as will be described in further detail later. The canopy 20 includes a first panel 22 pivotally coupled to a second panel 24 along an elongate and linear axis therebetween. It is understood that the first and second panels 22, 24 may be coupled together by sewing, a metal hinge, or other fastener that allows pivotal movement. More particularly, the juncture between the first and second panels 22, 24 defines a longitudinal axis that is both elongate and linear and about which the panels are pivotally movable.

The first and second panels 22, 24 each includes a generally rectangular configuration and has a relatively thin and planar configuration that includes a top surface and a bottom surface opposite the top surface. Further, the first and second panels 22, 24 include front edges 22a, 24a, respectively, and rear edges 22b, 24b, respectively, that are opposite and parallel to the front edges 22a, 24a. In addition, the first panel 22 includes an outer side edge 22c extending between the front edge 22a and rear edge 22b of the first panel 22 and, similarly, the second panel 24 includes an inner side edge 24c extending between the front edge 22a and rear edge 22b of the second panel 24. It should be noted that the front edges 22a, 24a define a width that is longer than a width defined by the rear edges 22b, 24b of the first and second panels, respectively. The side edges, while having an identical length, are not parallel but rather have an offset configuration that is wider adjacent the front edges and narrower adjacent the rear edges such that the canopy 20, as a whole, has a trapezoidal geometric configuration. This is crucial, of course since the geometric area adjacent the juncture between the open door and cabin of the automobile is smaller than the geometric area between the free end of the open door and side of the automobile. Thus, the geometric shape of the canopy 20, when deployed, has a functional structure in that it is intended to cover substantially the entire space between the open door 102 and the side of the cabin 104 of the automobile 100.

For the sake of clarity and as will be appreciated below, it is understood that the fabric has been removed in FIGS. 6a to 8b so as to more clearly show the elements and functional operation of the linkage 30.

Figure 1A:
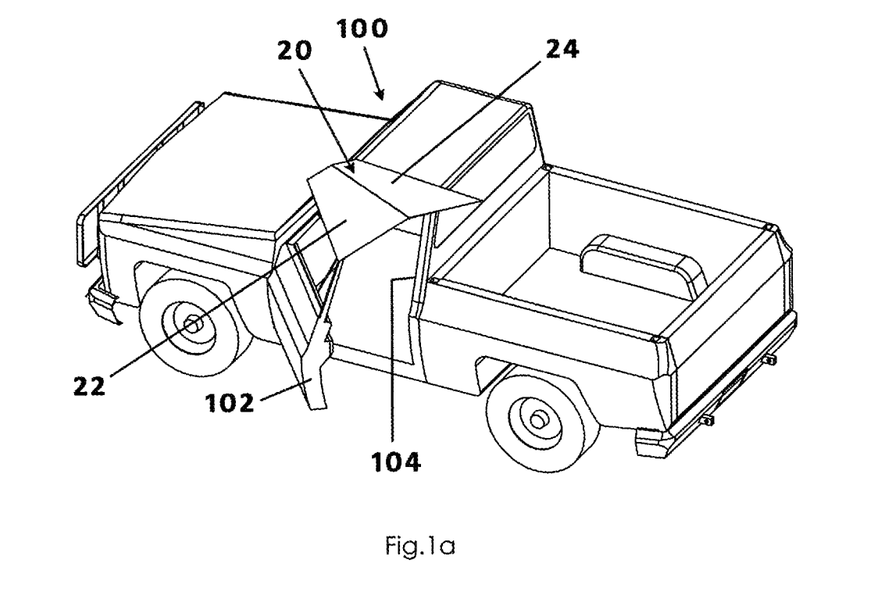
FIG. 1a is a perspective view of a privacy and weather shield according to a preferred embodiment of the present invention, illustrated with the curtains removed for clarity.
Figure 1B:
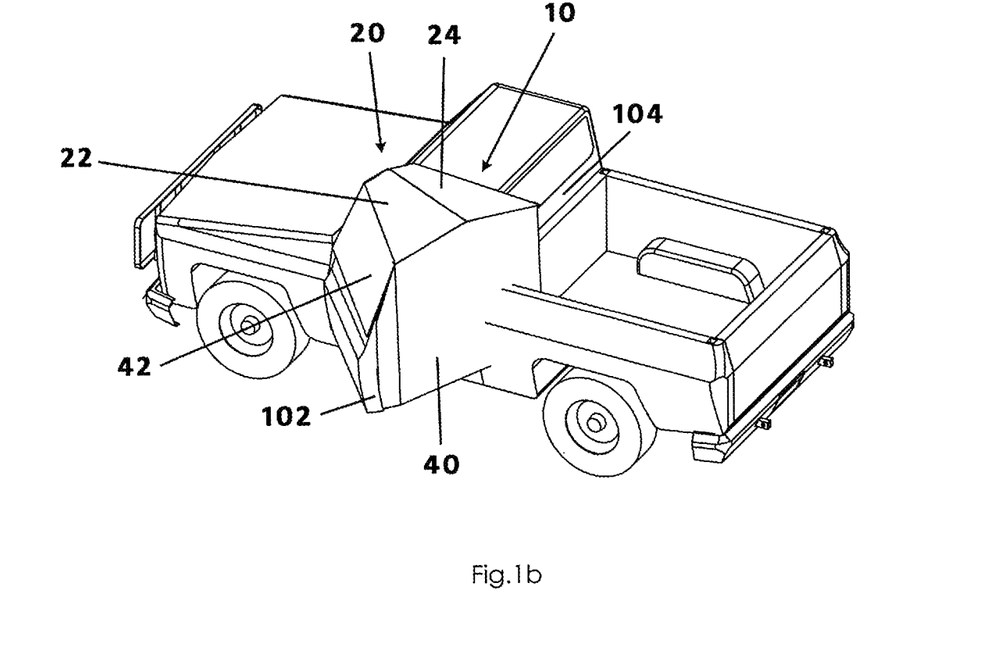
FIG. 1b is a perspective view of the privacy and weather shield as in FIG. 1a with the curtains installed and at a deployed configuration.
Figure 2:
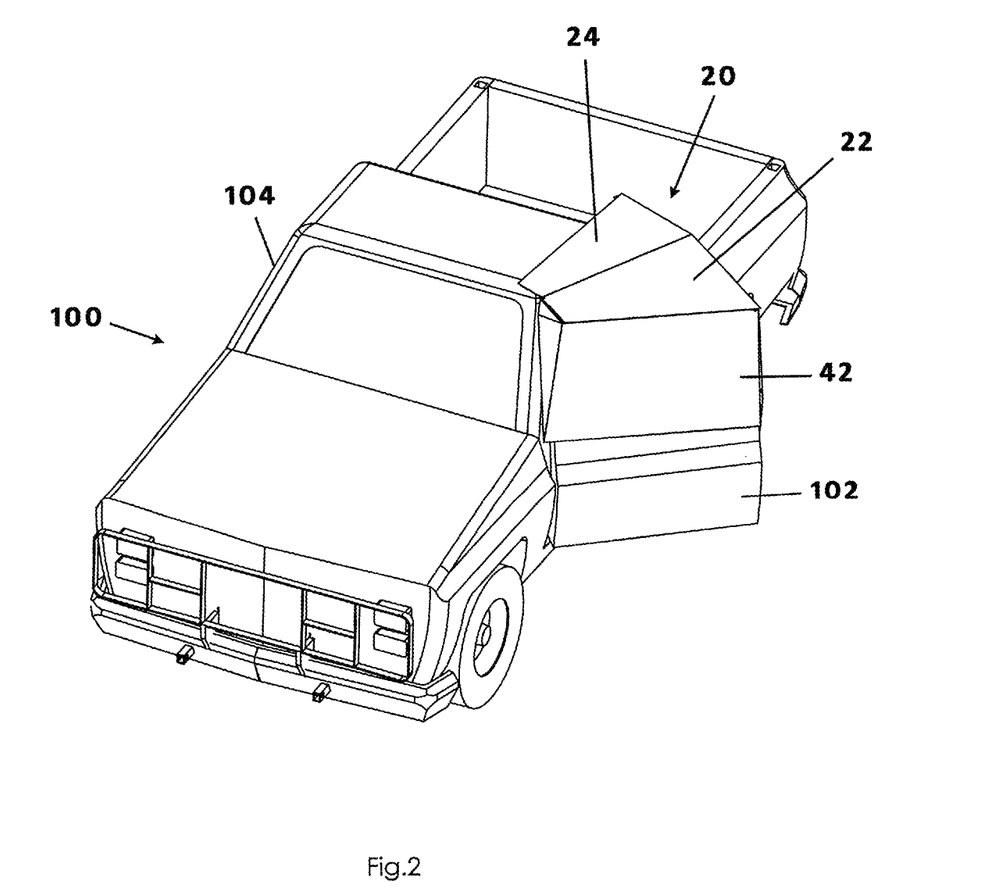
FIG. 2 is another perspective you of the privacy and weather shield as in FIG. 1a, illustrated from a forward position.
Figure 3A:
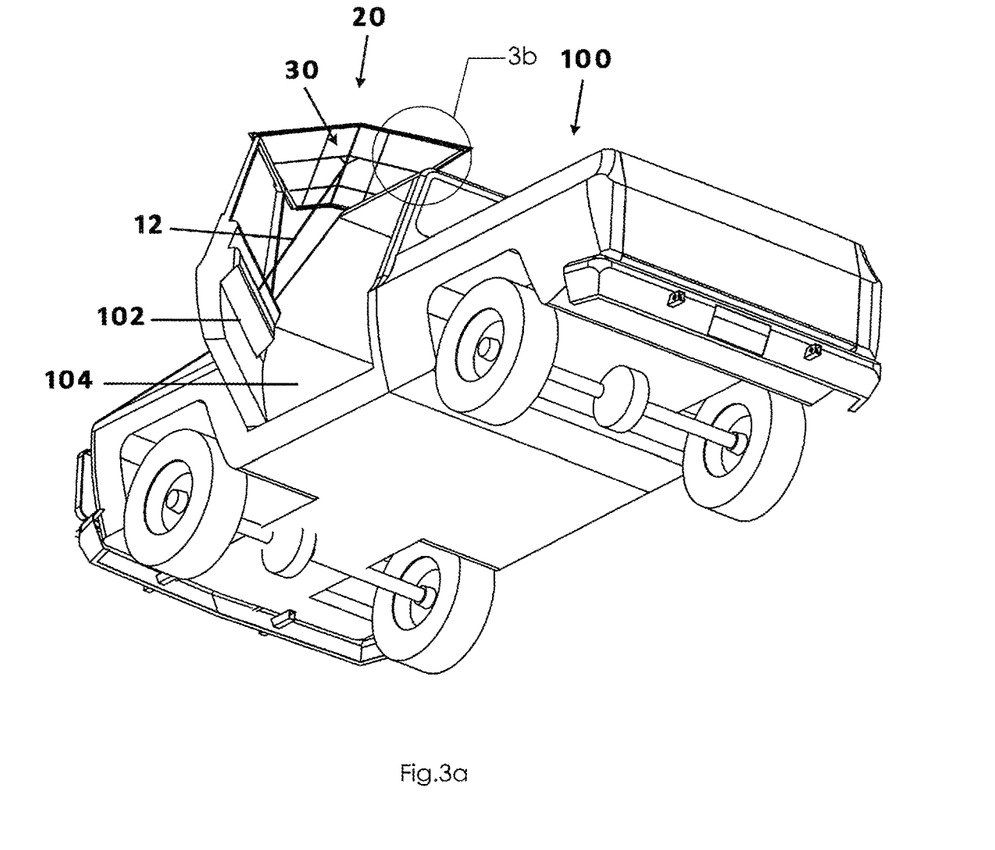
FIG. 3a is a perspective view of the privacy and weather shield as in FIG. 1a, illustrated from a lower elevation orientation.
Figure 3B:
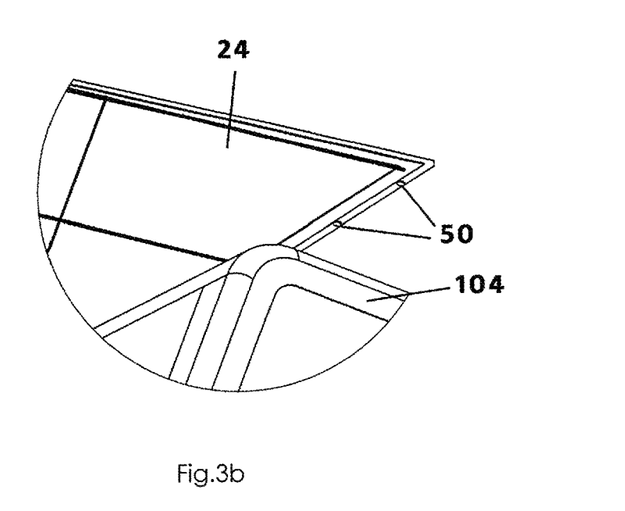
Figure 4A:
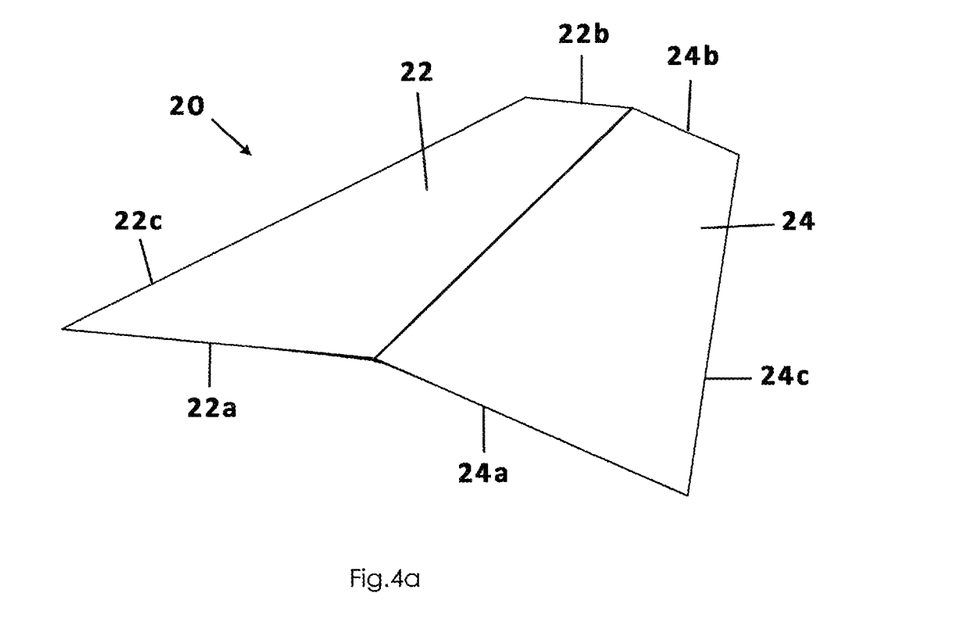
FIG. 4a is a perspective view of the canopy according to the present invention illustrated from an elevated orientation.
Figure 4B:
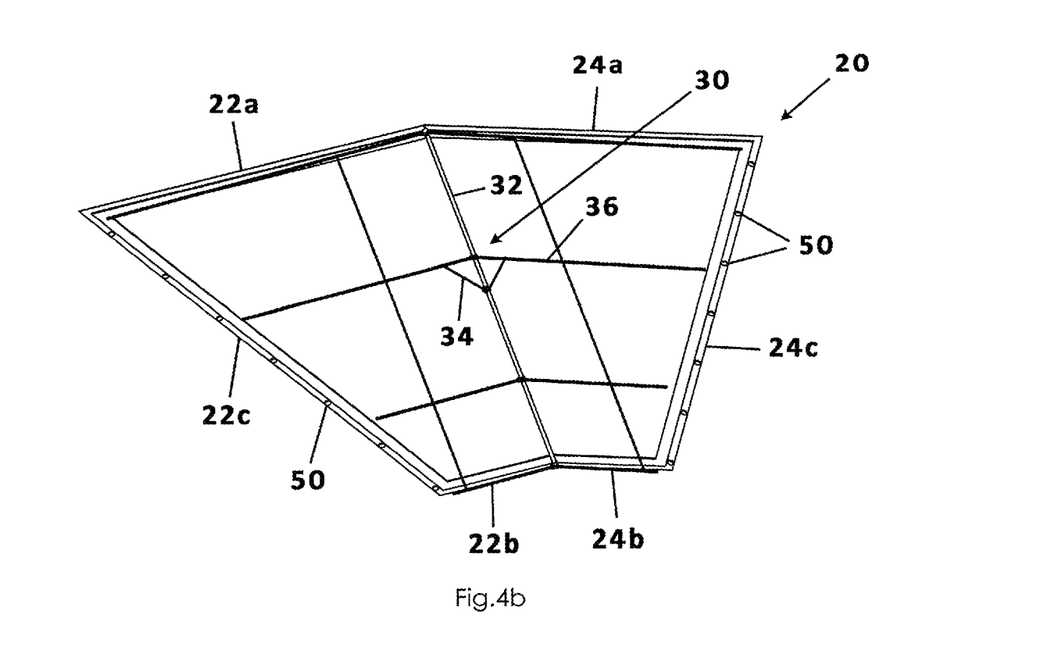
FIG. 4b is a perspective view of the canopy according to the present invention, illustrated from a bottom side perspective.
Figure 5A:
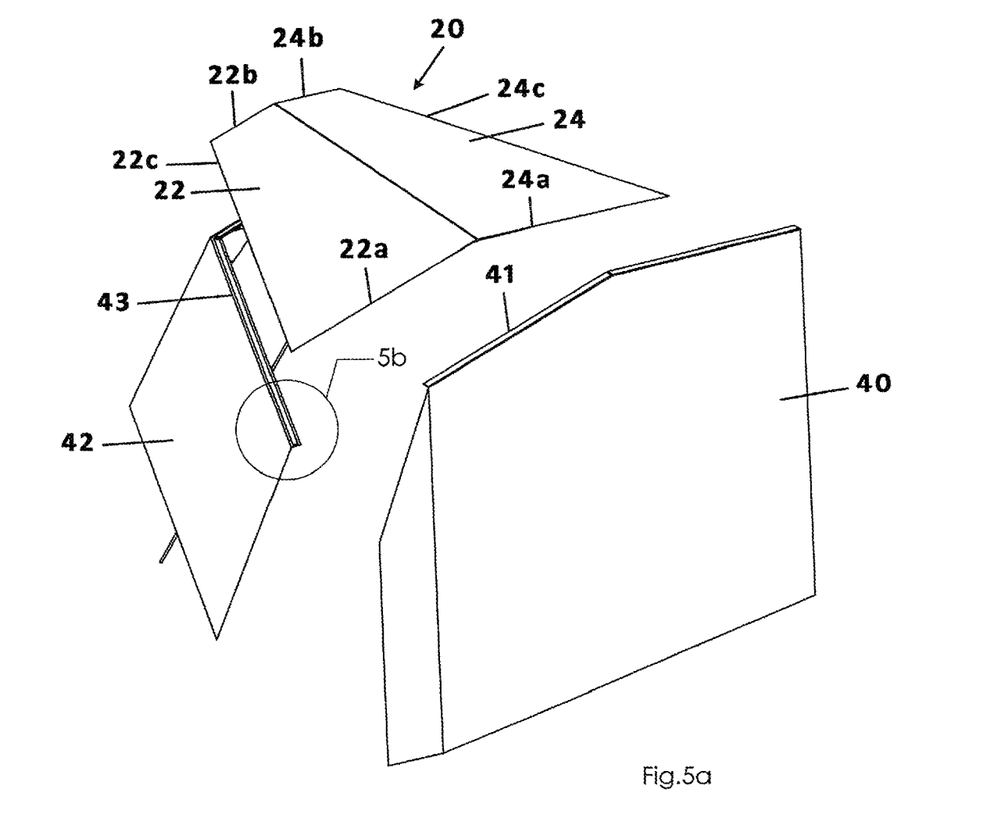
FIG. 5a is an exploded view of the privacy and weather shield as in FIG. 1b.
Figure 5B:
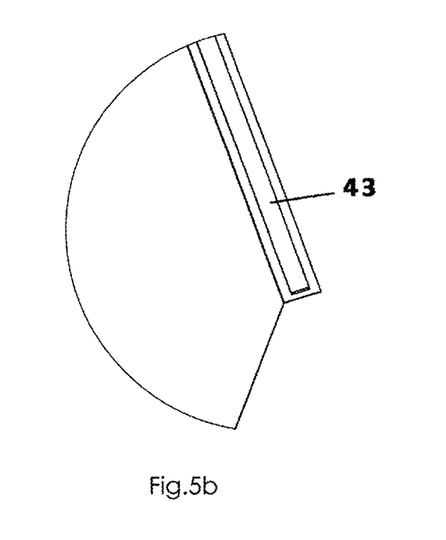
Figure 6A:
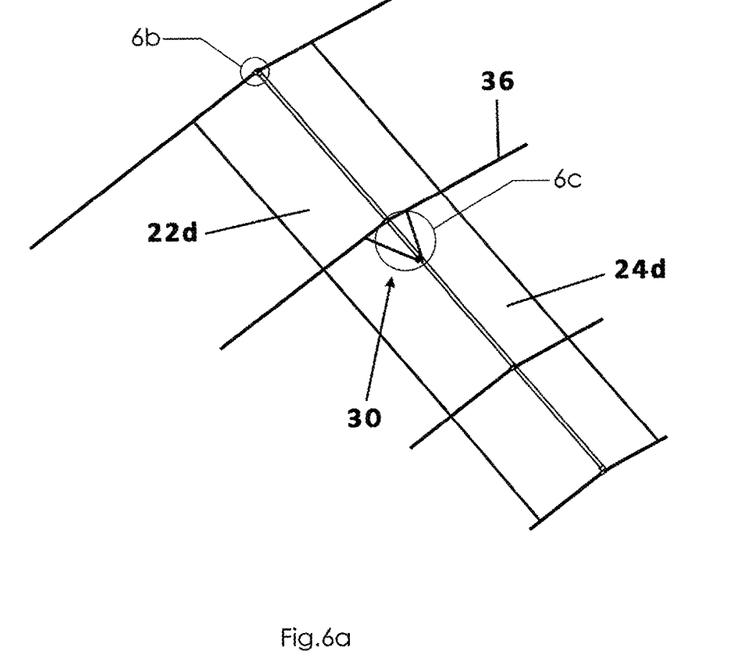
FIG. 6a is a bottom view of the canopy, illustrated with the linkage at a deployed configuration for clarity.
Figure 6B:
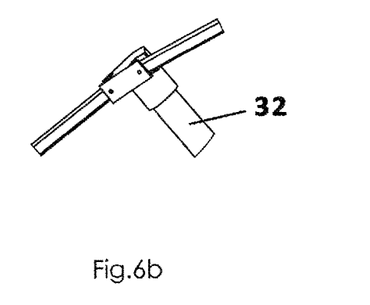
Figure 6C:
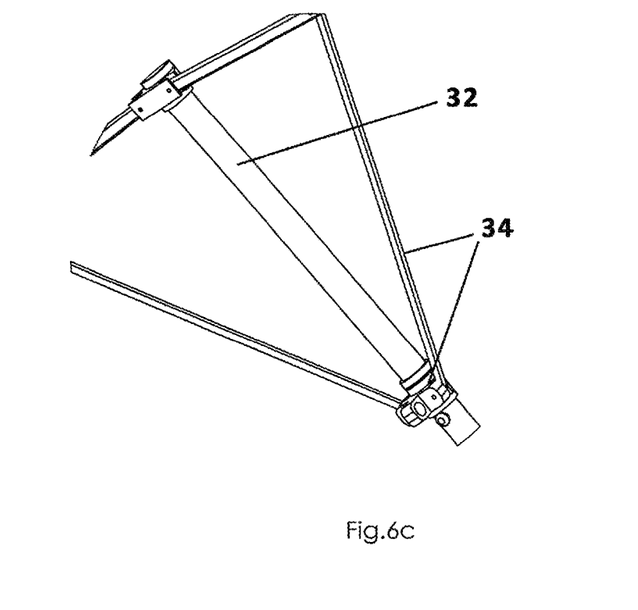
Figure 7:
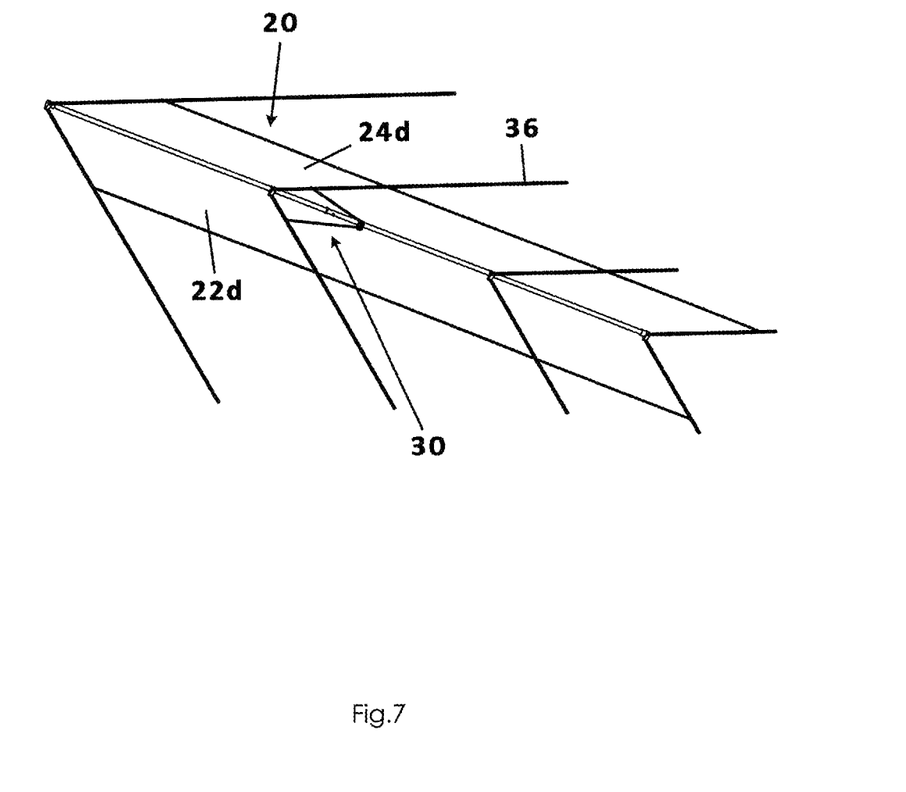
FIG. 7 is a bottom view of the canopy, illustrated with the linkage at a partially stowed configuration.
Figure 8A:
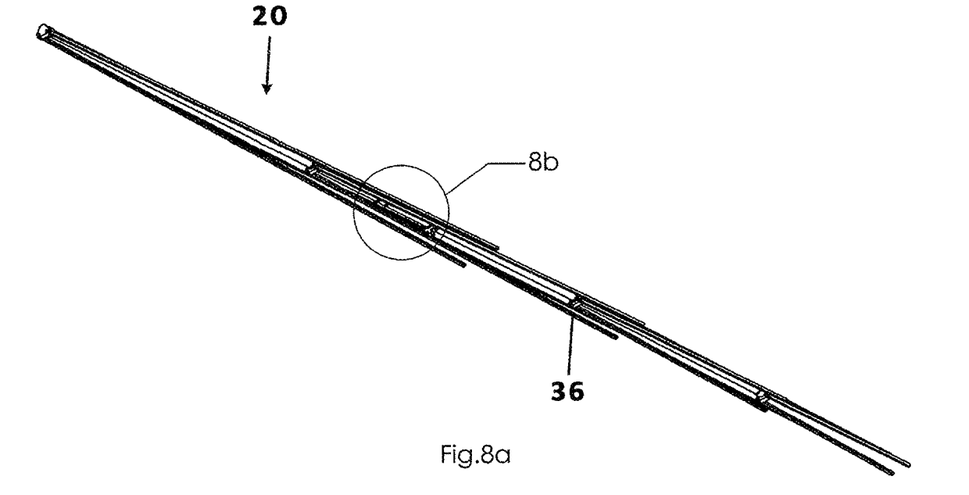
FIG. 8a is a perspective view of the canopy in a fully stowed configuration.
Figure 8B:
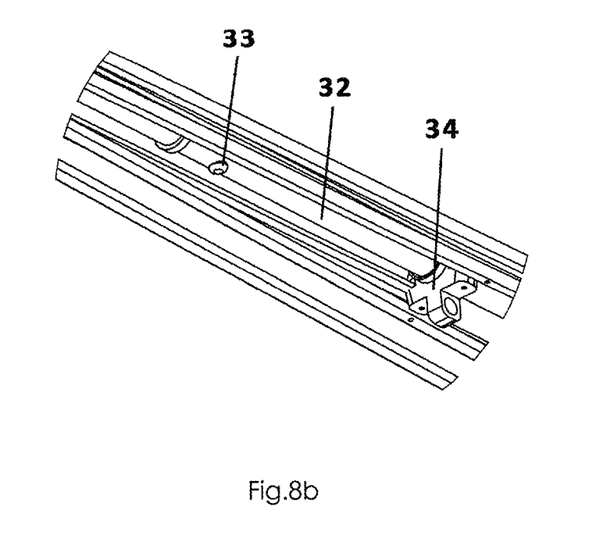

Another critical aspect of the privacy and weather shield 10 is the structures that move the canopy 20 between stowed and deployed configurations. Generally speaking the present invention includes a linkage 30 coupled to internal panels 22d, 24d that is operative, when actuated, to move the canopy 20 between a stowed configuration at which the second panel 24 is pivotally moved about the longitudinal axis so as to urge a folding or contracting movement of the internal panels 22d, 24d (and, as a result, the first and second panels 22, 24) toward a closed or folded configuration and, conversely, so as to urge an extension or deployment of the first and second panels 22, 24 toward an open or collectively planar configuration (FIG. 1a). More particularly, the linkage may include a shaft 32, such as a rod or other cylindrical element, positioned on the bottom surface of the canopy at a juncture between the first and second internal panels 22d, 24d, the shaft 32 having an elongate and linear configuration that defines the previously disclosed longitudinal axis. Further, the linkage may include a runner 34 slidably coupled to the shaft 32 that is, therefore, slidable along said axis. Further, the linkage 30 may include a plurality of spaced apart stretchers 36 each having a proximal end operatively coupled to the runner 34 and a distal end coupled to the first and second panels 22, 24, respectively, such that a longitudinal movement of the runner 34 causes the stretchers 36 to move the first and second panels 22, 24 pivotally between the stowed configuration and the deployed configuration as described above in more detail. In use, the canopy 20 may be stored in the folded configuration and then opened using the runner 34 and linkage 30. The shaft 32 may include a stop 33 mounted thereon for stopping the runner 34 from sliding too far or, in some embodiments, to releasably hold the runner 34 and, therefore, the canopy 20 at the deployed configuration until a predetermined pressure in a reverse direction moves the canopy 20 back to a retracted or stowed configuration.

When the first and second panels 22, 24 of the canopy 20 are moved to the deployed configuration, the canopy 20 may be mounted and supported atop the open side door 102 and rooftop of the cabin 104 of the automobile 100. More particularly, the bottom surface of the first panel 22 may be supported atop the side door 102 when the canopy 20 is at the deployed configuration. Similarly, the lower surface of the second panel 24 has a planar configuration that may be supported atop a rooftop of the cab of the automobile 100 when the canopy 20 is at the deployed configuration.

In a critical aspect, the privacy and weather shield 10 includes an elastic fastener 12 for securing the canopy 20 to the side door 102 of the automobile 100. The elastic fastener 12 may be a bungee cord or similar elastic device. A bungee cord is essentially a nylon-taste rubber band with one or more elastic strands forming a core and may be covered in a woven cotton or polypropylene sheets. In the present invention, the elastic fastener 12 may have a first end that may be coupled to the runner 34 and a second end releasably coupled to a handle of the side door 102 of the automobile 100. In an embodiment, each end of the elastic fasteners may include a hook or the like.

In another critical aspect, the privacy and weather shield 10 includes a first curtain 40 and a second curtain 42 for surrounding a user and when in use with an automobile, defines an interior space in which a user may change clothes out of the view of others as well as being protected from weather elements. As will be described below, each curtain may be selectively attached and released from the canopy 20 for storage between uses. First, the front edges 22a, 24a of the first and second panels 22, 24, collectively, define a continuous first length and includes a first attachment structure having hook and loop fasteners that extends along that continuous first length. The first curtain 40 includes an upper edge 41 having a second attachment structure having hook and loop fasteners such that the upper edge 41 and the second attachment structure may be releasably attached to the first attachment structure of the front edges 22a, 24a along an entirety of the continuous first length thereof. The first curtain 40 includes a body member that hangs from the first attachment structure, i.e., hanging from the front edges 22a, 24a toward and adjacent a ground surface.

Similarly, the outer side edge 22c of the first panel 22 defines a continuous second length and includes a third attachment structure having hook and loop fasteners along the continuous second length. The second curtain 42 includes an upper edge 43 having a fourth attachment structure having hook and loop fasteners such that the upper edge 43 and the fourth attachment structure may be releasably attached to the third attachment structure of the outer side edge 22c along an entirety of the continuous second length thereof. Accordingly, the first and second curtains 40, 42 may be releasably attached quickly and efficiently to edges of the canopy 20 via complementary hook and loop fasteners. Of course, other types of fasteners may also work for the attachment structures such as snaps, hooks, clasps, magnets, or the like. Further, the curtains may be constructed of a flexible material such as cotton, silk, polyester, nylon, linen, or the like. Of critical importance is that the curtains be made of a non-transparent material so that privacy if preserved as a user changes clothing within the interior area. In other words, the curtains are constructed of an opaque or heavily translucent material. In an embodiment, the curtains may be constructed of a flexible plastic or other waterproof material that would further protect from weather elements such as rain.

Figure 9A:
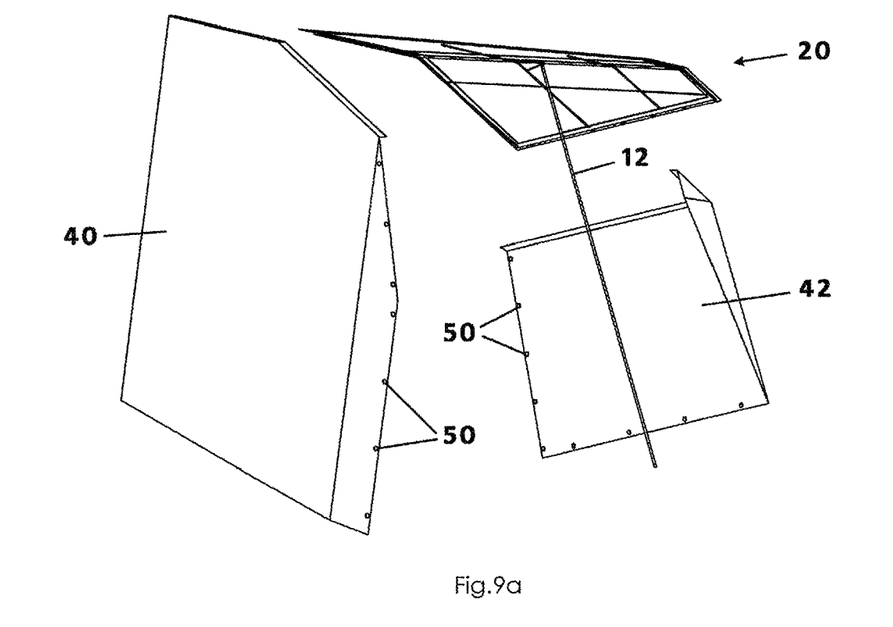
FIG. 9a is an exploded view of the privacy and weather shield as in FIG. 3.
Figure 9B:
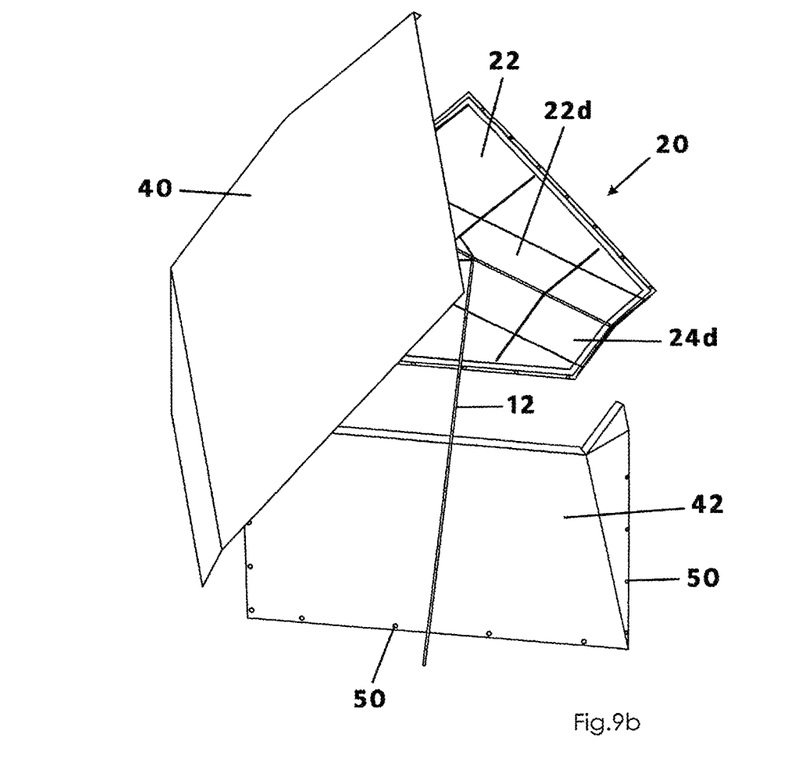
FIG. 9b is an exploded view as in FIG. 9a from a different angle.

In addition, each of the curtains 40, 42 may include a plurality of spaced apart fasteners that may couple respective curtains to either the side door 102 or cabin of the automobile 100. More particularly, the curtains 40, 42 each include a plurality of spaced apart fasteners 50, such as magnets, attached to or embedded in the fabric and operative to releasably attach to respective metal surfaces of the automobile cabin or inside portion of the door 102, i.e., though magnetic attraction. This, of course, enables the curtains to be positioned and gently held in place while a user changes clothes. Peripheral edges of the canopy 20 panels may also include magnet fasteners 50 for enhanced attachment atop the door 102 and cabin rooftop (FIGS. 9a and 9b).

In use, the canopy 20 may be moved to the storage configuration and stored with removed curtains 40, 42 in the trunk or under a seat of an automobile when not in use. Then, when privacy is needed, the canopy 20 may be deployed by operating the runner 34 and pivoting the stretchers 36 as described above and the portions of the deployed canopy 20 supported atop the roof of the cabin 104 and top of the open side door 102. The hook and loop fasteners of the curtains 40, 42 and respective edges of the canopy 20 may be releasably coupled together and fastened to respective surfaces of the door 102 and cabin or side of the automobile so as to form the interior privacy area wherein a user is able to change clothes without being viewed by other people.

It is understood that while certain forms of this invention have been illustrated and described, it is not limited thereto except insofar as such limitations are included in the following claims and allowable functional equivalents thereof.

The invention claimed is:

1. A privacy and weather shield for use with an automobile having a side door, said privacy and weather shield, comprising:
   a canopy including a first panel having opposed front and rear edges and including a second panel having opposed front and rear edges, said first and second panels being pivotally connected to one another along an axis having an elongate and linear configuration;
   wherein said first and second panels each having a framework covered by a waterproof material;
   a linkage coupled to said first and second panels along said axis that is operative, when actuated, to move said canopy between a stowed configuration at which said second panel is pivoted about said axis and urged toward said first panel in a folded manner and a deployed configuration at which said first and second panels are pivoted about said axis and urged away from one another in an extension manner;
   wherein said front edges of said first and second panels, respectively, together define a width dimension that is longer than a width dimension defined by said rear edges of said first and second panels, respectively;
   an elastic fastener having a first end coupled to said canopy and a second end releasably coupled to the side door of the automobile;
   and
   a first curtain having an upper edge releasably coupled to said front edges of said first and second panels, respectively, said first curtain having a body member that hangs from said front edges, respectively.

2. The privacy and weather shield as in claim 1, further comprising:
   a second curtain;
   wherein said first panel includes an outer side edge extending between said front and rear edges of said first panel, respectively, said outer side edge of said first panel defining a continuous second length; and
   wherein said second curtain includes an upper edge releasably coupled to said outer side edge of said first panel along an entirety of said second length, said second curtain having a body portion that hangs from said outer side edge.

3. The privacy and weather shield as in claim 2, wherein:
   said front edges of said first and second panels, together, include a first attachment structure; and
   said upper edge of said first curtain includes a second attachment structure that is complementary to and releasably coupled to said first attachment structure.

4. The privacy and weather shield as in claim 3, wherein:
   said outer side edge of said first panel includes a third attachment structure; and
   said upper edge of said second curtain includes a fourth attachment structure that is complementary to and releasably coupled to said third attachment structure.

5. The privacy and weather shield as in claim 4, wherein:
   said first and second attachment structures include hook and loop fastener material;
   said third and fourth attachment structures include hook and loop fastener material.

6. The privacy and weather shield as in claim 2, wherein:
   said first curtain is manufactured of a fabric material having a flexible construction;
   said second curtain is manufactured of a fabric material having a flexible construction.

7. The privacy and weather shield as in claim 6, wherein the fabric material of said first and second curtains, respectively, is a nontransparent material.

8. The privacy and weather shield as in claim 2, wherein:
   said first curtain includes a plurality of first fastening structures spaced apart and attached along a peripheral edge of said body member, said plurality of first fastening structures each being operative for releasable attachment to portions of the automobile;
   said second curtain includes a plurality of said fastening structures spaced apart and attached along a peripheral edge of said body portion, said plurality of fastening structures each being operative for releasable attachment to portions of the automobile.

9. The privacy and weather shield as in claim 1, wherein:
   said first and second panels have a trapezoidal configuration when deployed for use;

said first panel includes a bottom surface having a planar configuration that is supported atop the side door of the automobile when open; and said second panel includes a lower surface having a planar configuration that is supported atop a rooftop of a cab of the automobile.

10. The privacy and weather shield as in claim 1, further comprising:
   a shaft positioned along a bottom surface of said canopy at a juncture between said first and second panels of said canopy and having an elongated and linear configuration so as to define said longitudinal axis;
   wherein said linkage includes a runner slidably coupled to said shaft and a plurality of stretchers having a proximal end coupled to said runner and a distal end coupled to said first and second panels, respectively, such that a movement of said runner causes said stretchers to pivotally move said first and second panels between said stowed and said deployed configurations.

11. A privacy and weather shield for use with an automobile having a side door, said privacy and weather shield, comprising:
   a canopy including a first panel pivotally coupled to a second panel, said first and second panels each having opposed front and rear edges, respectively, said first and second panels each having a framework covered by a waterproof material;
   a shaft positioned along a bottom surface of said canopy at a juncture between said first and second panels of said canopy and having an elongate and linear configuration so as to define a longitudinal axis;
   a runner slidably coupled to said shaft;
   a plurality of stretchers each having a proximal end coupled to said runner and a distal end coupled to said first and second panels, respectively, such that a movement of said runner causes said stretchers to pivotally move said first and second panels between a stowed configuration at which said second panel is pivoted about said longitudinal axis and urged toward said first panel in a folded manner and a deployed configuration at which said first and second panels are pivoted about said axis and urged away from one another in an extension manner;
   wherein said front edges of said first and second panels, respectively, together define a width dimension that is greater than a width dimension defined by said rear edges of said first and second panels, respectively;
   an elastic fastener having a first end coupled to said runner and a second end releasably coupled to the side door of the automobile;
   wherein said front edges of said first and second panels, together, define an elongate continuous span;
   a first curtain having an upper edge releasably coupled to said front edges of said first and second panels, respectively, and along an entirety of said span, said first curtain having a body member that hangs from said rear edges of said first and second panels, respectively.

12. The privacy and weather shield as in claim 11, further comprising:
   a second curtain;
   wherein said first panel includes an outer side edge extending between said front and rear edges of said first panel, respectively; and
   wherein said second curtain includes an upper edge releasably coupled to said outer side edge of said first panel, said second curtain having a body portion that hangs from said outer side edge.

13. The privacy and weather shield as in claim 12, wherein:
   said front edges of said first and second panels, together, include a first attachment structure having hook and loop fasteners; and
   said upper edge of said first curtain includes a second attachment structure having hook and loop fasteners that is complementary to and releasably coupled to said first attachment structure.

14. The privacy and weather shield as in claim 13, wherein:
   said outer side edge of said first panel includes a third attachment structure having hook and loop fasteners; and
   said upper edge of said second curtain includes a fourth attachment structure having hook and loop fasteners that is complementary to and releasably coupled to said third attachment structure.

15. The privacy and weather shield as in claim 12, wherein:
   said first curtain is manufactured of a fabric material having a flexible construction;
   said second curtain is manufactured of a fabric material having a flexible construction.

16. The privacy and weather shield as in claim 15, wherein the fabric material of said first and second curtains, respectively, is a non-transparent material.

17. The privacy and weather shield as in claim 12, wherein:
   said first curtain includes a plurality of first fastening structures spaced apart and attached along a peripheral edge of said body member, said plurality of first fastening structures each being operative for releasable attachment to portions of the automobile;
   said second curtain includes a plurality of second fastening structures spaced apart and attached along a peripheral edge of said body portion, said plurality of second fastening structures each being operative for releasable attachment to portions of the automobile.

18. The privacy and weather shield as in claim 17, wherein said plurality of first and second fastening structures are magnets.

19. The privacy and weather shield as in claim 11, wherein:
   said canopy has a trapezoidal configuration when said first and second panels are deployed for use;
   said first panel includes a bottom surface having a planar configuration that is supported atop the side door of the automobile when said canopy is deployed; and
   said second panel includes a lower surface having a planar configuration that is supported atop a rooftop of a cab of the automobile when said canopy is deployed.

20. A privacy and weather shield for use with an automobile having a side door, said privacy and weather shield, comprising:
   a canopy including a first panel pivotally coupled to a second panel, said first and second panels each having opposed front and rear edges, respectively, said first and second panels each having a framework covered by a waterproof material;
   a shaft positioned along a bottom surface of said canopy at a juncture between said first and second panels of said canopy and having an elongate and linear configuration so as to define a longitudinal axis;
   a runner slidably coupled to said shaft;
   a plurality of stretchers each having a proximal end coupled to said runner and a distal end coupled to said first and second panels, respectively, such that a movement of said runner causes said stretchers to pivotally move said first and second panels between a stowed configuration at which said second panel is pivoted about said longitudinal axis and urged toward said first panel in a folded manner and a deployed configuration at which said first and second panels are pivoted about said axis and urged away from one another in an extension manner;

wherein said front edges of said first and second panels, respectively, together define a width dimension that is longer than a width dimension defined by said rear edges of said first and second panels, respectively; and an elastic fastener having a first end coupled to said runner and a second end releasably coupled to the side door of the automobile.

\* \* \* \* \*